United States Patent [19]
Bills

[11] Patent Number: 5,871,316
[45] Date of Patent: Feb. 16, 1999

[54] CARGO SUPPORT FOR TRUCK BED

[75] Inventor: Dennis Bills, Lapeer, Mich.

[73] Assignee: The Colonel's, Inc., Milan, Mich.

[21] Appl. No.: 810,533

[22] Filed: Mar. 3, 1997

[51] Int. Cl.⁶ ................................................ B60P 7/08
[52] U.S. Cl. ............................... 410/42; 410/50; 410/97; 410/36
[58] Field of Search .................... 410/32, 36, 40, 410/42, 121, 143, 97, 150; 206/443, 446; 211/175, 13.1; 124/403, 404, 405, 552; 296/39.2, 3

[56] References Cited

U.S. PATENT DOCUMENTS

| Re. 30,373 | 8/1980 | Nist, Jr. .................................. 410/42 X |
|---|---|---|
| 2,851,235 | 9/1958 | Henig ..................................... 410/49 X |
| 2,901,201 | 8/1959 | Taylor et al. ............................. 410/50 |
| 4,111,481 | 9/1978 | Nix et al. . |
| 4,236,854 | 12/1980 | Rogers ..................................... 410/121 |
| 4,382,733 | 5/1983 | Rodgers ................................... 410/49 |
| 4,492,499 | 1/1985 | Gasper ..................................... 410/32 |
| 4,572,568 | 2/1986 | Kapp et al. . |
| 4,767,149 | 8/1988 | Rye . |
| 4,772,165 | 9/1988 | Bartkus .............................. 410/150 X |
| 4,887,947 | 12/1989 | Bott ........................................ 410/144 |
| 4,936,625 | 6/1990 | Pickard et al. . |
| 4,974,895 | 12/1990 | Davenport . |
| 5,000,503 | 3/1991 | Bernatek . |
| 5,044,682 | 9/1991 | Wayne ............................... 410/129 X |
| 5,090,763 | 2/1992 | Kremer et al. ...................... 410/121 X |
| 5,118,156 | 6/1992 | Richard .............................. 410/143 X |
| 5,165,747 | 11/1992 | Stringer et al. . |
| 5,167,434 | 12/1992 | Bott .................................... 410/129 X |
| 5,169,201 | 12/1992 | Gower . |
| 5,240,301 | 8/1993 | Arnold ................................ 410/129 X |
| 5,255,951 | 10/1993 | Moore, III ................................ 296/3 |
| 5,257,850 | 11/1993 | Brim . |
| 5,265,993 | 11/1993 | Wayne ................................... 410/129 |
| 5,308,133 | 5/1994 | Mangum et al. . |
| 5,372,397 | 12/1994 | Arndt . |
| 5,427,487 | 6/1995 | Brosfske ................................ 410/121 |
| 5,556,151 | 9/1996 | New et al. . |

FOREIGN PATENT DOCUMENTS

| 759360 | 9/1980 | U.S.S.R. ................................ 410/36 |
|---|---|---|
| 1323953 | 7/1973 | United Kingdom .................... 410/42 |
| 1409559 | 10/1975 | United Kingdom .................... 410/49 |

*Primary Examiner*—Stephen T. Gordon
*Attorney, Agent, or Firm*—Gifford, Krass, Groh, Sprinkle, Patmore, Anderson & Citkowski, P.C.

[57] ABSTRACT

A cargo support bar for use with a truck bed or truck bed liners has a pair of spaced equipment holders. Each holder has at least two upwardly extending arms which define slots for carrying cargo and equipment. A center area is formed between the equipment holders for carrying sheet material. Straps with hooks are provided to extend over the cargo. The support bars have a plastic shell extending over a 2'×4' wooden core. Two or more of the bars are positioned within pockets formed in the side walls of a truck bed or a truck bed liner to extend across the width and to support cargo and equipment in a double tier arrangement.

10 Claims, 3 Drawing Sheets

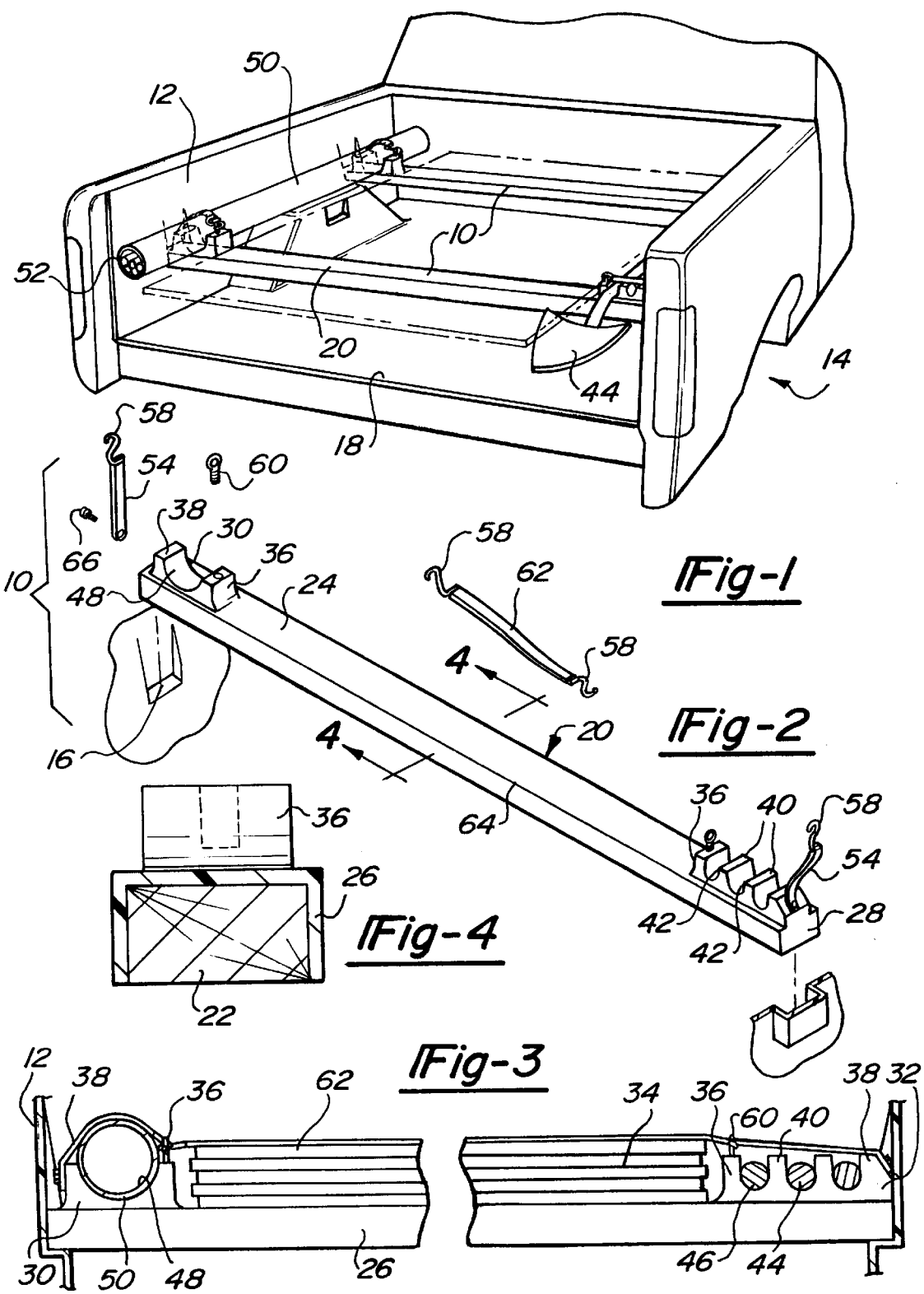

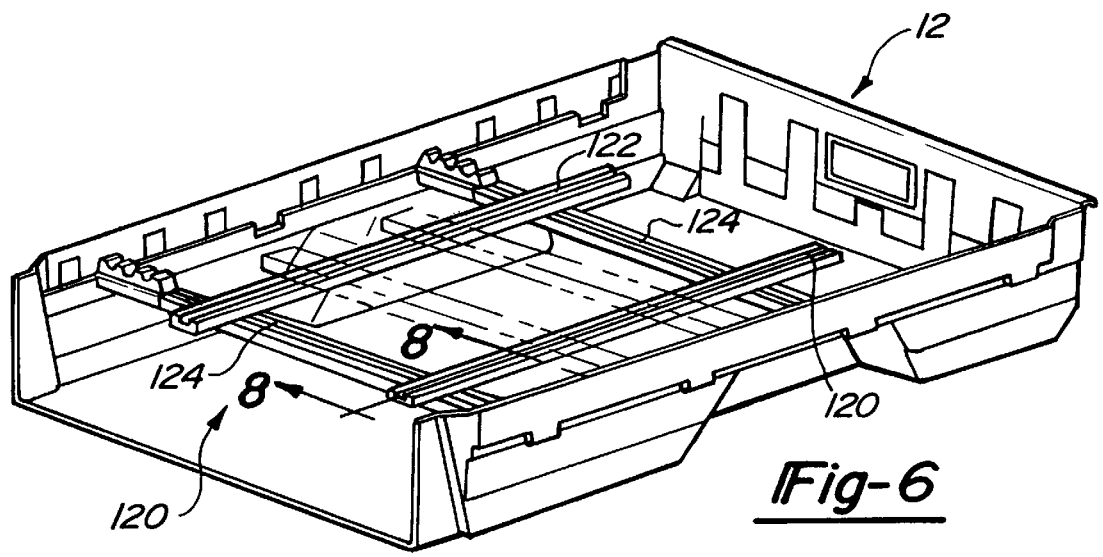
Fig-6
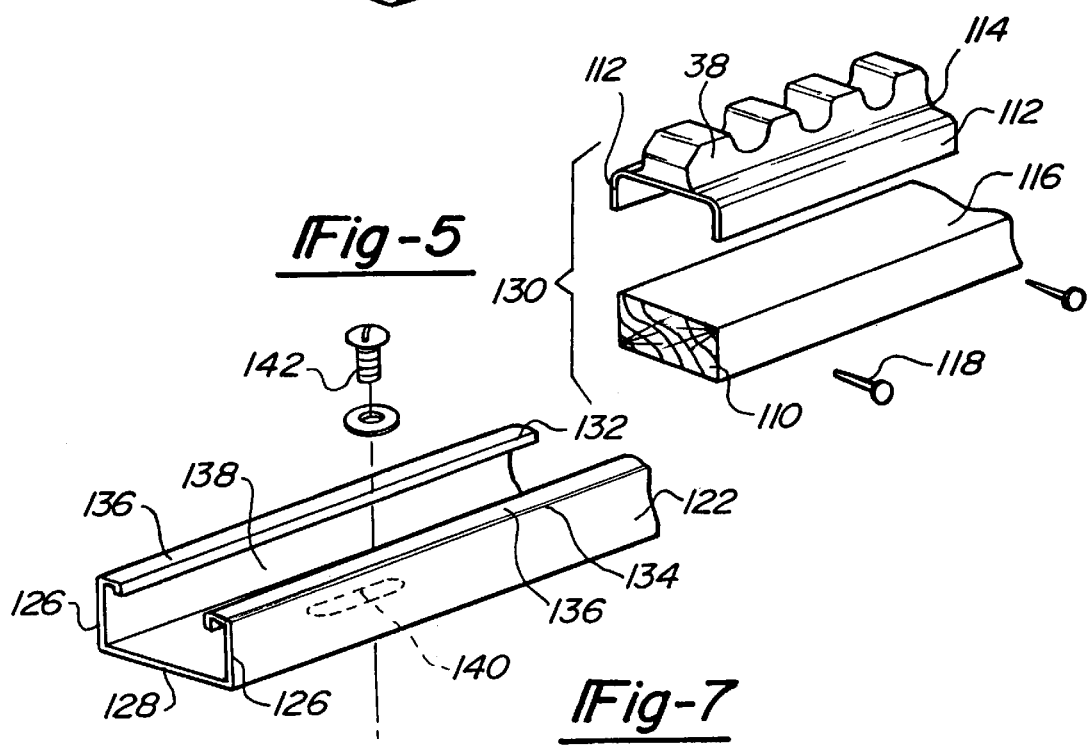
Fig-5
Fig-7

CARGO SUPPORT FOR TRUCK BED

BACKGROUND OF THE INVENTION

I. Field of the Invention

The present invention relates to cargo holders for a pickup truck bed or a bed liner, and more particularly, for forming two tier cargo support.

II. Description of the Prior Art

Organizers have been devised for use in transporting cargo in pickup truck beds and truck bed liners. Typically, these organizers include walls or inserts which are mounted to the truck bed liner, such as disclosed in U.S. Pat. No. 5,044,682. It is also known to mount boards in slots in the liner to extend across the width of the truck bed to restrain cargo, as disclosed in U.S. Pat. No. 5,167,434. Recently, many truck beds and truck bed liners have been formed to support cargo on an upper tier. The beds or liners are formed with pairs of pockets to hold several boards horizontally across the width of the liner and spaced vertically upwardly from the floor to support equipment and cargo in a two-tiered arrangement. Such an arrangement is disclosed in U.S. Pat. No. 4,767,149 and is particularly advantageous for hauling large sheet material such as drywall, plywood, or paneling.

However, the known supports and organizers do not satisfactorily secure cargo such as garden tools, pipes, or fishing poles, which frequently slide within the truck bed or truck bed liner.

Accordingly, it is an object of this invention to provide support which permits a two-tier arrangement for hauling large sheet material in a stable position.

Additionally, it is an object of the invention to provide an apparatus which is adapted to securely transport elongated cargo, such as tubing and fishing poles, securely within a truck bed or truck bed liner.

SUMMARY OF THE INVENTION

According to the present invention, a support bar for mounting in side pockets of a truck bed or truck bed liner is provided. The support bar is mounted in the pockets to extend transversely across the truck bed. The bar includes a pair of equipment holders which are spaced apart on ends of the bar. The holders are spaced apart a predetermined distance, such as four feet. Each holder includes a plurality of arms which extend upwardly in a parallel spaced apart relationship to form slots for carrying cargo such as rods, pipes, garden tools and fishing poles. At least two of the bars are inserted in pockets formed in the sides of the truck bed or liner to extend from side to side across the width of the truck bed liner or truck bed to securely support the cargo. The cargo is loaded between the arms to extend longitudinally within the truck bed or liner across the support bars.

Elastic cords with hooks are mounted to extend across the top of each holder to engage an eye to hold the cargo and equipment in place. The bar includes a shell of molded material and a strengthening core of material, such as a wooden 2'×4' board. Alternatively, a bar may be formed by affixing molded equipment holders to a wooden board. An adjustable metal grid may also be attached to the support bar for holding a shelf or specialized equipment.

Other advantages and features of the present invention will be more fully understood from the following description of the invention, the appended claims, and the drawings, a brief description of which follows.

BRIEF DESCRIPTION OF THE DRAWINGS

FIG. 1 is a perspective view of a support bar in accordance with the invention mounted for use in a truck bed liner;

FIG. 2 is a perspective fragmentary view of a support bar in accordance with the invention;

FIG. 3 is a side view of a support bar in position within a truck bed liner;

FIG. 4 is a cross-sectional view of a support bar taken along lines 4—4 of FIG. 2;

FIG. 5 is an alternative embodiment of a support bar having an equipment holder mounted to a board;

FIG. 6 is a perspective view of a pair of support bars and an adjustable metal grid mounted in a truck bed liner in accordance with the invention;

FIG. 7 is an exploded fragmented view of a portion of a lower channel and of a longitudinal channel of the grid in accordance with the invention;

DETAILED DESCRIPTION OF THE PREFERRED EMBODIMENT

Figure 8:
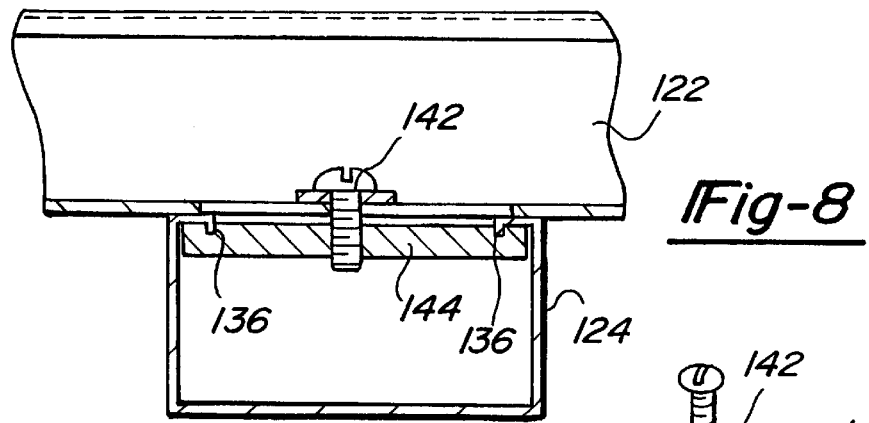
FIG. 8 is a partial cross-sectional view of a longitudinal channel mounted to a lower channel taken along lines 8—8 of FIG. 6.

The present invention consists of a support bar 10 for cargo for use in a truck bed liner 12 of a pickup truck 14 as shown in FIG. 1. The support bar 10 may also be used with truck beds (not shown) which have appropriate pockets. The pockets 16 may be positioned adjacent a floor 18 (not shown). Pairs of opposed pockets 16 are formed in the truck bed liner 12 in a spaced apart relationship from the floor 18 of the truck bed or truck bed liner 12 as shown. Such pockets 16 are commonly formed in truck bed liners and truck beds for accepting boards such as 2'×4"s. Three to five pairs of pockets 16 are generally provided in the liner 12.

As best shown in FIGS. 2 and 4, the support bar 10 in accordance with the present invention includes a shell 20 and an elongated core 22 having a rectangular cross-section. The shell is unitarily formed of a synthetic moldable material such as plastic. The shell 20 has a top wall 24 and a pair of side walls 26, as best shown in FIG. 4. The side walls 26 and top wall 24 extend between a pair of end walls 28 to form an inner channel to receive the core 22, such as a 2'×4' piece of wood to provide strength. Alternatively, but not shown, a grid of longitudinal and transverse stringers can be molded in the inner channel, or the channel may be filled with a synthetic resin foam material.

As best shown in FIGS. 2 and 3, equipment holders 30, 32 extend upwardly from the top wall 24 at each end of the support bar 10. The equipment holders 30, 32 are spaced apart a predetermined distance, such as slightly over 4', to permit 4'×8' sheets of material 34 such as drywall or paneling to be loaded between the equipment holders 30, 32. Each equipment holder 30, 32 has an inner arm 36 and an outer arm 38 to form slots to hold cargo. Equipment holder 32 has a pair of center arms 40 extending upwardly between the inner arm 36 and outer arm 38 to form slots 42 for carrying small diameter cargo and apparatus such as garden tools 44. The equipment holder 32 may include a radiused bottom surface 46 extending between the arms.

Alternatively, the equipment holder 30 has relatively large semicircular surface 48 particularly adapted to hold a tube 50 such as a piece of PVC pipe, for holding pipes 52 (FIG. 1), or fishing rods (not shown), etc. The support bars 10 may be formed in a variety of arrangements for particular types of cargo.

As shown in FIGS. 2 and 3, straps 54 are provided to extend over the arms of the equipment holders 30, 32 to secure cargo within the equipment holders. The straps 54 are preferably stretchable material having one end secured to the outer arm 38 of the equipment holder by a screw 66, and a hook 58 at an opposite end. Eyes 60 are mounted on the inner arm 36 of each equipment holder 30, 32 for receiving hooks 58 of the straps 54. A long strap 62 having a hook 58 at either end is provided to extend across a center portion 64 of each bar between the eyes 60 to hold cargo mounted thereunder. The bars are positioned in appropriate pockets of the truck bed or truck bed liner for the length of the cargo.

Shown in FIG. 5 is an alternative embodiment of the invention which includes an equipment holder 130 mounted to a wooden cross piece 110, such as a 2'×4'. The equipment holder is formed similarly to the equipment holders 30 and 32 disclosed for support bar 10 above, except that the equipment holder 130 is formed separately and mounted directly to the wooden cross piece 110. The equipment holder 130 has an inverted U-shaped cross-section having a pair of downwardly extending flanges 112 extending from an upper portion 114 formed with arms 36, 38 forming slots 42 as above. The upper portion 114 rests on a upper surface 116 of the cross piece. The flanges 112 extend down sides of the cross piece and are secured by a suitable method, such as nails 118 or screws. In this way, a number of equipment holders having differently sized and shaped slots can be mounted in any position across the 2'×4' to provide support for the cargo being carried.

As best shown in FIGS. 6–10, the equipment holder 130 cross piece 110 may be provided with a metal gridwork 120. The gridwork 120 includes longitudinal channels 122 adjustably mounted to base channels 124 which are mounted to the support bar 10 or cross piece 110. The base channel 124 is mounted to the top of the support bar 10 between equipment holders 30 and 32 or is mounted to the upper surface 116 of the cross piece 110 between a pair of equipment holders 130 as shown in FIG. 6. The base channel 124 and longitudinal channel are identically formed of a metal, such as an aluminum extrusion, having a pair of side walls 126 extending up from a bottom wall 128. An L-shaped flange 132 extends inwardly and then downwardly from an upper edge 134 of each side wall 126 and defines a pair of rails 136 with an opening 138 therebetween. Apertures 140 are formed in the bottom wall 128 to permit securing of the channels 122 and 124 together or mounting of the base channel 124 to the cross piece 110 or support bar 10 with fasteners such as screws (not shown).

As shown in FIG. 7, each of the longitudinal channels 122 is secured to the base channel 124 by threading a bolt 142 through the aperture 140 into a clamp nut 144. The clamp nut has a pair of parallel spaced apart grooves 146 on an upper surface 148 formed to receive the rails 136 of the channel. A threaded aperture 150 is formed between the grooves 146 to receive the bolt 142. In this way, the longitudinal channels 122 may be mounted in a desired position. Two or more of the longitudinal channels 122 may be secured to the pair of base channels 124 to form a support for a shelf or equipment needing special support.

Figure 9:
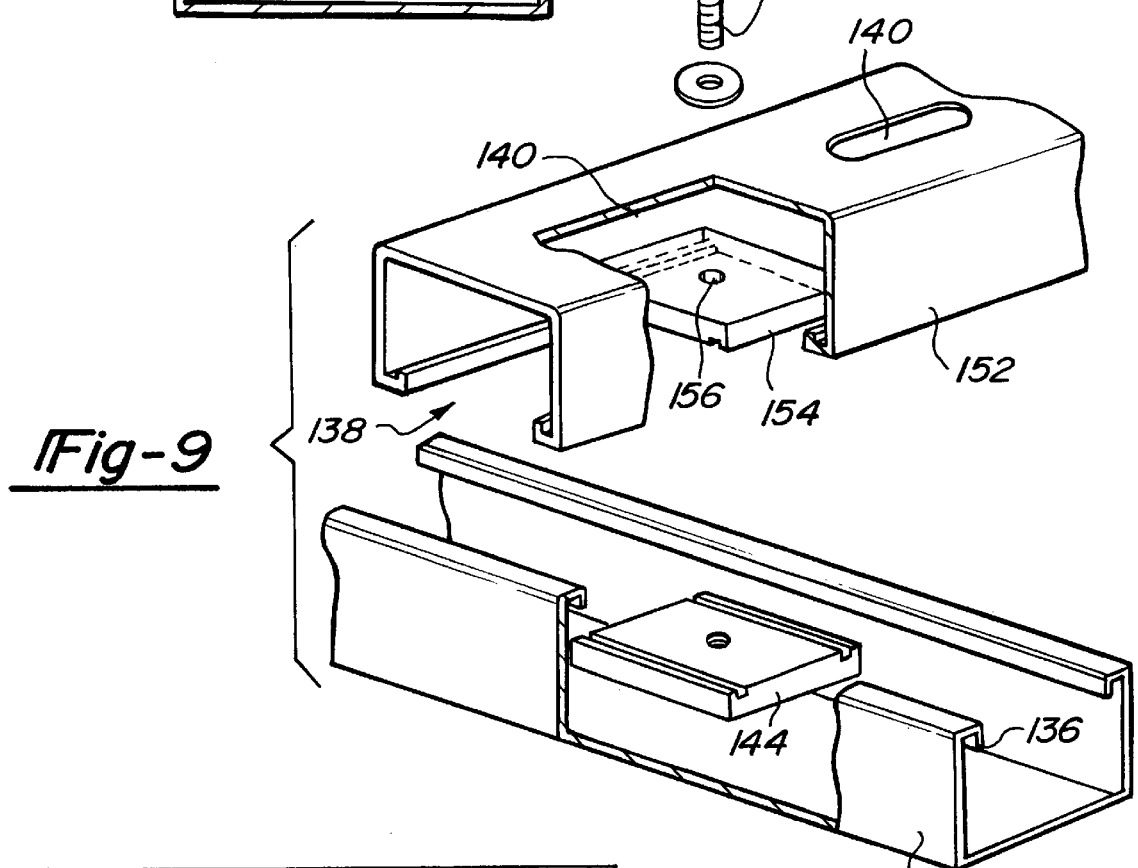
FIG. 9 is an exploded fragmentary view of a transverse channel member mounted to a longitudinal channel member and mounting blocks.
Figure 10:
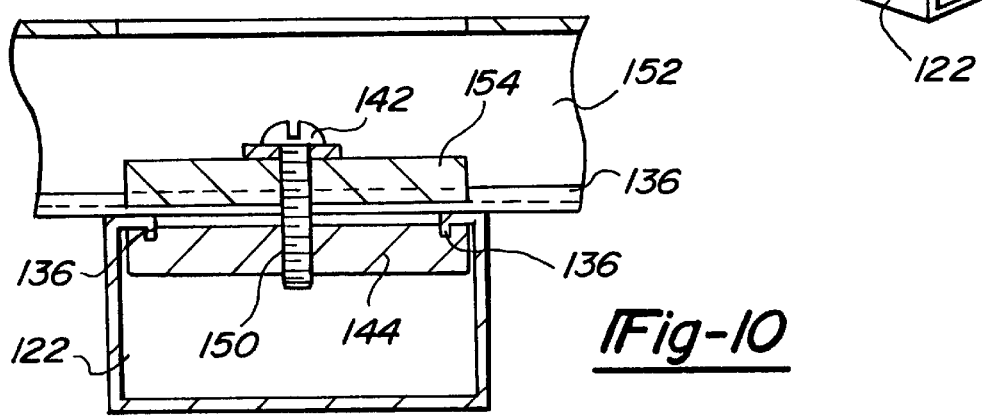
FIG. 10 is a partial cross-sectional view of a transverse channel member mounted to a longitudinal channel member.

If desired, additional transverse channels 152 can be mounted to the longitudinal channels 122 as shown in FIGS. 9 and 10. The transverse channels 152 are formed identically as the longitudinal and base channels 122, 124, however, the transverse channels 152 are positioned transversely across the longitudinal channels 122 with the opening 138 between the flanges 132 at a lower side of the channel adjacent the opening 138 of the longitudinal channel 122. A square slide 154 having a pair of grooves 146 spaced apart which receive the rails 136 of the transverse channel 152 and is positioned on the flanges of the transverse channel 152 above the clamp nut 144 positioned beneath it on the rails 136 of the longitudinal channel 122, as shown in FIG. 10. A bolt 142 passes through an aperture 156 in the slide 154 and is threadably received in the clamp nut 144. The transverse channel 152 is then positioned and the bolt 142 tightened to lock the transverse channel 152 in position with the longitudinal channel 122. Accordingly, one or more transverse channels 152 can be positioned in a desired position to extend transversely across the longitudinal channels 122.

Having described my invention, however, many modifications thereto may become apparent to those skilled in the art. These and other changes are within the spirit of the invention as defined by the scope of the appended claims.

I claim:

1. A support bar for holding cargo and equipment for use with a truck bed liner or truck bed having a pair of pockets formed in a side wall of said liner or bed, said support bar comprising:

an elongated cross member having a predetermined length and having a generally flat top surface extending between a pair of ends, said elongated member having a rectangular cross section, each of said pair of ends adapted to be received in a respective one of said pair of pockets, a pair of equipment holders unitarily formed on said elongated member and spaced apart on said top surface of said elongated member by a cargo holder, each said equipment holder having a pair of arms extending outwardly from said top surface and spaced apart a predetermined distance, said cargo holder having an unobstructed flat portion extending a predetermined distance greater than said distance between said arms of each said equipment holder, said top surface having a flat portion extending between said equipment holders for receiving cargo.

2. The support bar according to claim 1, wherein said elongated member is unitarily formed with said pair of equipment holders of a moldable material.

3. The support bar of claim 2, wherein said cross member has a pair of sides extending from said top surface.

4. The support bar of claim 3, further comprising a core member formed of wood mounted within said cross member between said pair of sides.

5. The support bar of claim 1, wherein said cross member is formed of wood.

6. The support bar of claim 1, wherein each said equipment holder has a radiused bottom surface extending between its respective pair of arms.

7. The support bar of claim 1, further comprising a strap mounted to extend across at least one of said pair of arms.

8. The support bar of claim 1 further comprising a base channel member mounted to said cross member.

9. The support bar of claim 8 further comprising a longitudinal channel mounted to a base channel member.

10. A support bar for holding cargo which is adapted to be mounted in a pair of pockets formed in a side wall of a truck bed or truck bed liner, said support bar comprising:

an elongated shell member unitarily formed of moldable material having a top portion and a pair of sides, extending orthogonally from respective longitudinal edges of said top portion, said top portion and said pair of sides defining a channel having a predetermined length, said shell member having at least one equipment holder having at least two arms extending outwardly from said top portion and said shell member; and a wooden core member having a rectangular cross section mounted within said channel of said shell member beneath said top portion and between said pair of sides, said core member having a length at least as great as said predetermined length of said channel.

\* \* \* \* \*